United States Patent
Furukawa et al.

(10) Patent No.: US 8,157,085 B2
(45) Date of Patent: Apr. 17, 2012

(54) DEVICE FOR MONITORING A CONVEYOR BELT

(75) Inventors: Kazuya Furukawa, Yokohama (JP); Yukinobu Nishikita, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 183 days.

(21) Appl. No.: 12/513,082

(22) PCT Filed: Nov. 12, 2007

(86) PCT No.: PCT/JP2007/071930
§ 371 (c)(1),
(2), (4) Date: Dec. 24, 2009

(87) PCT Pub. No.: WO2008/056807
PCT Pub. Date: May 15, 2008

(65) Prior Publication Data
US 2010/0089725 A1   Apr. 15, 2010

(30) Foreign Application Priority Data
Nov. 10, 2006   (JP) .................................. 2006-304943

(51) Int. Cl.
*B65G 43/02* (2006.01)
(52) U.S. Cl. .......... 198/810.03; 198/810.02; 198/810.04
(58) Field of Classification Search ............. 198/810.02, 198/810.03, 810.04
See application file for complete search history.

(56) References Cited

U.S. PATENT DOCUMENTS

| | | | | |
|---|---|---|---|---|
| 4,682,105 A * | 7/1987 | Thorn | ............................ | 324/230 |
| 4,780,746 A * | 10/1988 | Naramore et al. | ............. | 271/274 |
| 5,647,640 A * | 7/1997 | Heintzmann et al. | .......... | 299/1.6 |
| 6,341,522 B1 * | 1/2002 | Goss et al. | ...................... | 73/159 |
| 6,390,287 B2 * | 5/2002 | Riffe | ............................. | 198/830 |
| 6,441,904 B1 * | 8/2002 | Shakespeare | ................. | 356/429 |
| 6,752,908 B2 * | 6/2004 | Gustafson et al. | ......... | 162/358.3 |
| 6,808,063 B2 * | 10/2004 | Itoh et al. | ...................... | 198/788 |
| 6,865,358 B2 * | 3/2005 | Lee | ................. | 399/167 |
| 7,132,943 B2 * | 11/2006 | Nelson | ......................... | 340/551 |
| 7,275,637 B2 * | 10/2007 | Brown | ..................... | 198/810.02 |
| 7,427,767 B2 * | 9/2008 | Kemp | ...................... | 250/559.39 |
| 7,572,214 B2 * | 8/2009 | Gustafson | ........................ | 492/9 |
| 7,748,521 B2 * | 7/2010 | Aizawa et al. | ........... | 198/810.03 |

FOREIGN PATENT DOCUMENTS

| | | |
|---|---|---|
| JP | 61-116618 U | 7/1986 |
| JP | 06-048533 A | 2/1994 |
| JP | 10-218340 A | 8/1998 |
| JP | 2000-062937 A | 2/2000 |

* cited by examiner

Primary Examiner — Douglas Hess
(74) Attorney, Agent, or Firm — Sughrue Mion, PLLC

(57) ABSTRACT

A device for monitoring a conveyor belt in which a sensor can be fixed easily to the body without using any special fixing device and the properties of the conveyor belt can be detected with high precision. The device for monitoring the conveyor belt comprises a body to be detected embedded in a conveyor belt running endlessly, and a sensor provided oppositely thereto in the body. The sensor detects the variation in properties of the conveyor belt by detecting variation of the body to be detected due to the variation in properties of the conveyor belt. The sensor is secured to a shaft which supports a hollow roller for guiding the conveyor belt in the conveyance direction rotatably on the body in the roller thus making the sensor itself nonrotatable.

6 Claims, 5 Drawing Sheets

DEVICE FOR MONITORING A CONVEYOR BELT

BACKGROUND OF THE INVENTION

The present invention relates to a device for monitoring a conveyor belt.

In such a device for monitoring a conveyor belt, an object to be detected is embedded in or attached on the conveyor belt. A sensor for detecting the object is fixed to a stationary object close to the moving object to the conveyor belt. Owing to variation in information detected by the sensor, variations in the shape of the conveyor belt such as meandering, a crack and wear can be detected. JP6-48533A discloses magnets as object to be detected. A sensor detects magnetic force, so that the conditions of a conveyor belt can be grasped with variation in magnetic force A gauss meter, a loop coil and a MI sensor (magnetic-impedance sensor) are used as sensor.

JP6-48533A discloses that the sensor is provided in a roller or a pulley.

JP6-48533A merely discloses that the sensor is provided in the roller and pulley, but there is no detailed structure on how to fix the sensor in the rotating roller or how to pull out a cable extending from the sensor.

In the publication, the belt does not always contact the roller. The distance between the sensor and the belt varies when the roller contacts the belt and when the roller does not contact the belt. Meandering of the belt can be detected, but it would be very difficult to exactly detect other variations in shape of the belt such as wear.

SUMMARY OF THE INVENTION

In view of the disadvantages in the prior art, it is an object of the invention to provide a device for monitoring a conveyor belt, a sensor being easily mounted to a stationary structure without special mounting means, the shape of the belt being detected with high accuracy.

DETAILED DESCRIPTION OF PREFERRED EMBODIMENTS

FIGS. 1-4 show a conveyor belt comprising the first embodiment of the present Invention.

Figure 1:
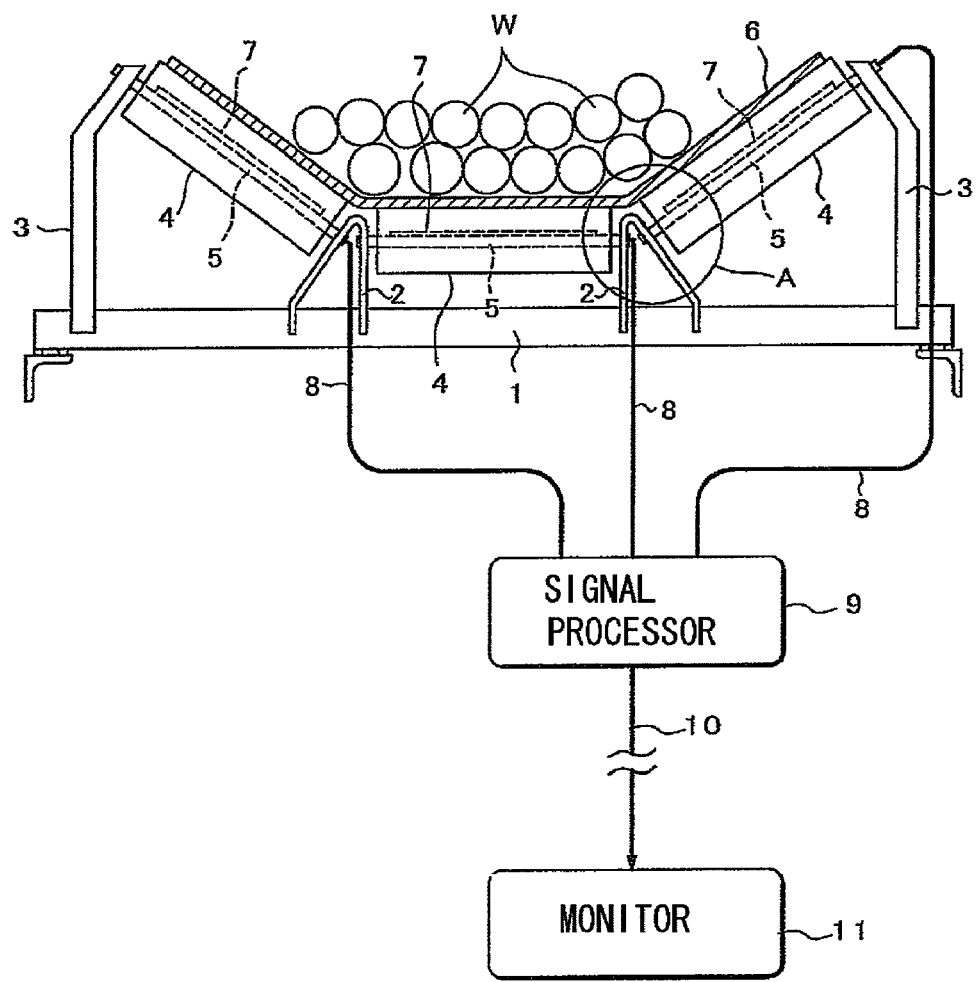
FIG. 1 is a vertical sectional front view of a conveyor belt comprising the first embodiment of a device for monitoring the conveyor belt according to the present invention with a monitor for the conveyor belt.

In FIG. 1, at plural positions along the length of a horizontal support frame 1 of the conveyor belt, there are a pair of lower inner brackets 2,2 and a pair of higher outer brackets 3,3 in the middle and side of the support frame 1 respectively.

Between the inner bracket 2 and the inner bracket 2, a guide roller 4 is rotatively mounted around a shaft 5, and between the inner bracket 2 and the outer bracket 3, a roller 4 is rotatively mounted around a shaft 5 and tilted to rise sideward.

The roller 4 may be made of HDPE (high density polyethylene), PP and ABS which are excellent in processing capability, strength, sliding performance and cost.

The roller may be made of POM (polyacetal) which is better than HDPE, PP and ABS in sliding performance.

PA66 and PA6 may be used and is better than HDPE, PP and ABS in heat resistance and sliding performance.

Magnetized electric conductors such as Al alloy may be used.

An endless trough-like conveyor belt 6 is placed on the rollers 4 and runs smoothly by rotating the rollers 4 around the shaft 5.

The conveyor belt 6 is wound between a driving pulley and a driven pulley (not shown). Materials are held on the middle of the upper surface of the conveyor belt 6, conveyed along a going path from one end to the other end and thrown away onto a hopper. Then, the conveyor belt 6 is guided through guide rollers (not shown) under the support frame 1 along a returning path.

In FIGS. 2-6, the roller 4 is hollow and has an elongate sensor 7 on the shaft 5 therein. The detecting surface of the sensor 6 faces the lower surface of the conveyor belt 6.

A cable 8 coupled at one end to the sensor 7 extends from the axial end of the shaft 5 and is connected to a signal processor 9. The sensor 7 may be a magnetic sensor such as a gauss meter, a loop coil and an MI sensor if magnets are used as object to be detected.

A signal detected by the sensor 7 is converted to an electric signal by a signal processor 9 and fed to a monitor 11 via a cable 10. Thus, the conveyor belt 6 can be monitored continuously along the width of the belt 6.

Figure 2:
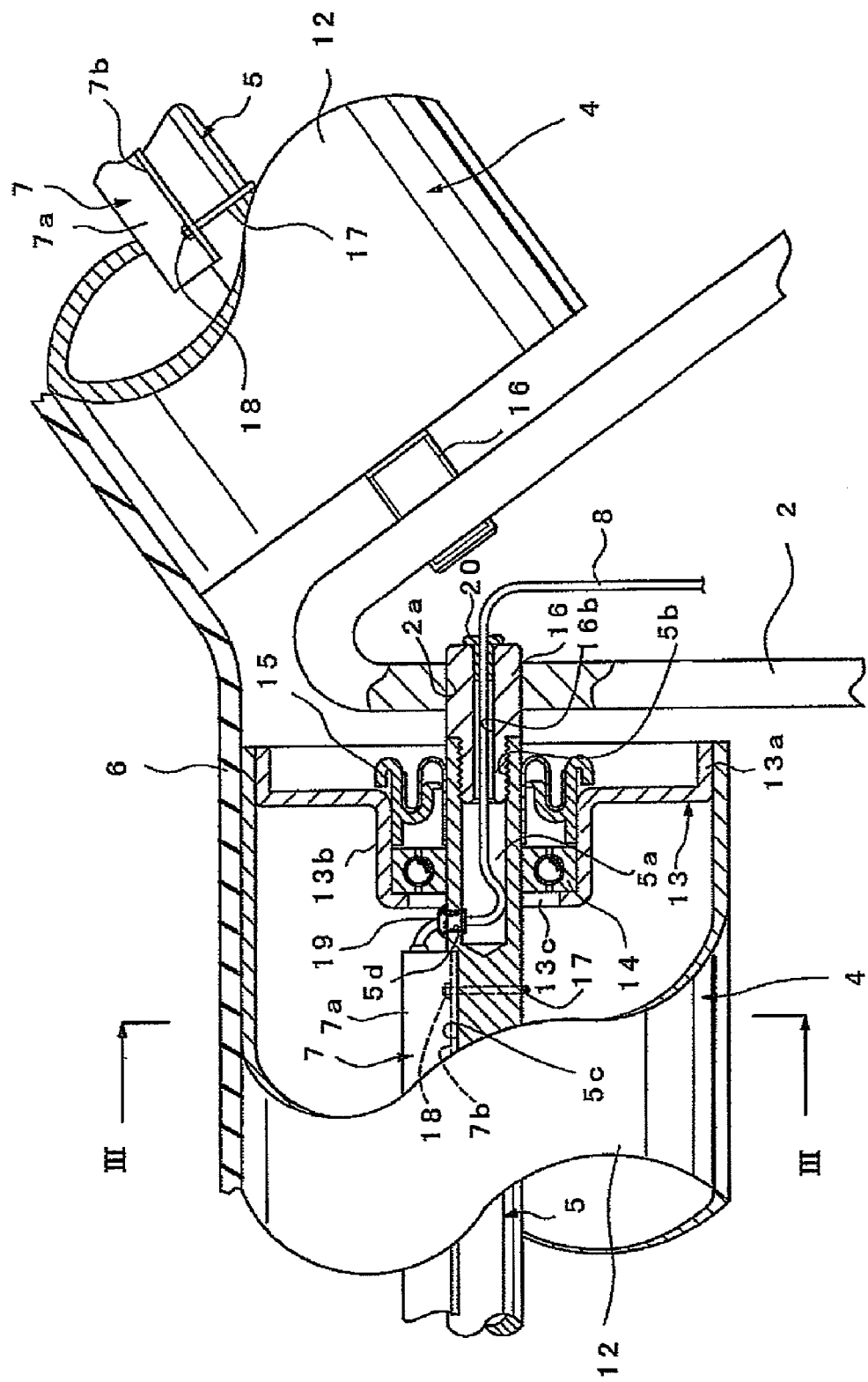
FIG. 2 is an enlarged partially cutaway view showing the section A in FIG. 1.
Figure 3:
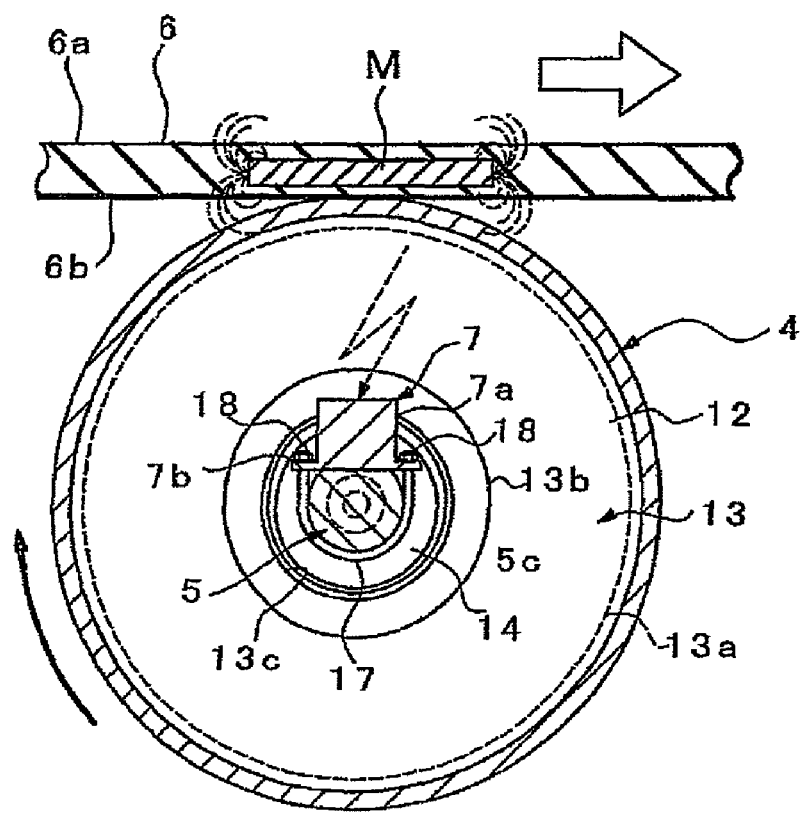
FIG. 3 is a vertical sectional view taken along the line III-III in FIG. 2.
Figure 4:
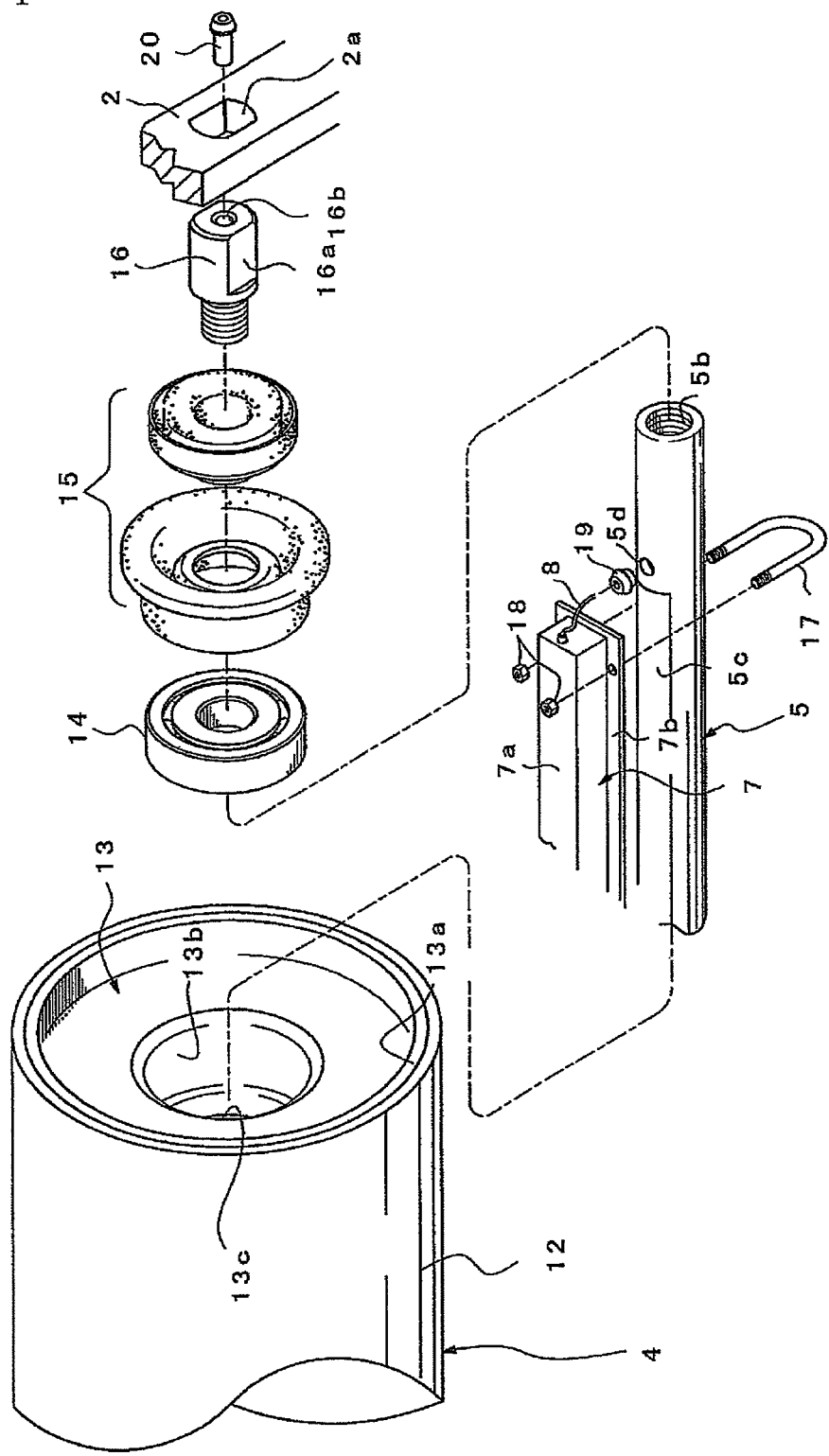
FIG. 4 is an exploded perspective view showing parts in the section A in FIG. 1.

FIGS. 2-4 show an internal structure of the roller 4 in detail. The roller 4 comprises a hollow roller body 12 and an end plate 13 fixed to each end of the roller body 12. An outward flange 13a of the end plate 13 is fixed to the inner surface of the roller body 4 by shrinkage fit and a tubular portion 13b is provided in the middle. A hole 13c is formed in the middle of the tubular portion 13b.

The roller 4 is rotatively mounted around the shaft 5 via a ball bearing 14. A combined labyrinth seal 15 over the ball bearing 14 provides water resistance on the bearing part.

A cavity 5a is formed at one end of the shaft 5. A closure 16 engages in a thread bore 5b of the cavity 5a.

The closure 16 projecting outward from the shaft 5 is not circular in a vertical cross section with a pair of flat surfaces 16a,16a on the outer circumferential surface. The noncircular closure 16 engages in a noncircular axial hole 2a of the bracket 2, so that the shaft 5 is positioned with respect to the bracket 2 to allow the sensor 7 mounted on the shaft 5 to face the conveyor belt 6 anytime.

Specifically, the closure 16 at the end of the shaft 5 is noncircular and engages in the noncircular axial hole 2a of the bracket 2 to allow the sensor 7 to face the conveyor belt 6 anytime.

A flat surface 5c is formed on the outer circumferential surface of the shaft 5. A rectangular case 7a including the sensor 7 is placed on the flat surface 5c along the length of the shaft 5. A U-like piece 17 engages on the shaft 5, and the ends of the U-like piece 17 pass through an outward flange 7b at the lower end of the case 7a. The ends of the U-like piece 17 are tightened with nuts 18. So the sensor 5 is firmly fixed to the shaft 5.

At the end of the shaft 5, there is formed a through hole 5*d* which communicates with the cavity 5*a* and opens in the outer circumferential surface of the shaft 5. A water-proof grommet 19 fits in the through hole 5*d*.

The cable 8 from one end of the case 7*a* extends through the through hole 5*d*, the grommet 19, the cavity 5*a*, the through hole 16*b* at the center of the closure 16 and a grommet 20 fitting in the opening end of the through hole 16*b*, and is pulled out.

For assembling, the case 7*a* for the sensor 7 is mounted to the shaft 5 with a mounting tool 17. After the cable and the closure 16 are mounted as above, they are inserted in the roller 4 via the mounting hole 13*c* of the roller 4 and the sensor 7 is placed at a desired position in the roller 4. The ball bearing 14 and the seal 15 are mounted in the tubular portion 13*b* at each end of the roller 4. The ball bearing 14 and seal 15 may have been provided at one end of the roller 4 in advance.

Only the horizontal roller 4 is shown in detail in the drawings, but the tilted roller 4 is provided at different posture with structure similar to the horizontal roller 4.

In FIG. 3, a lower non-conveying surface 6*b* of the conveyor belt 6 that conveys materials on the upper surface goes on the roller 4 as shown in an arrow. A magnet M embedded in the conveyor belt 6 is detected by the sensor 7, and a detected signal is sent to the signal processor 9 via the cable 8. It is converted into an electric signal which is fed into the monitor 11 via the cable 10, so that meandering, a crack or wear is detected certainly.

Besides the magnet M including magnetic rubbers, what transmits sound, light, vibration, magnetic force or electromagnetic wave may be used, and a detector that receives such a signal may be used.

Figure 5:
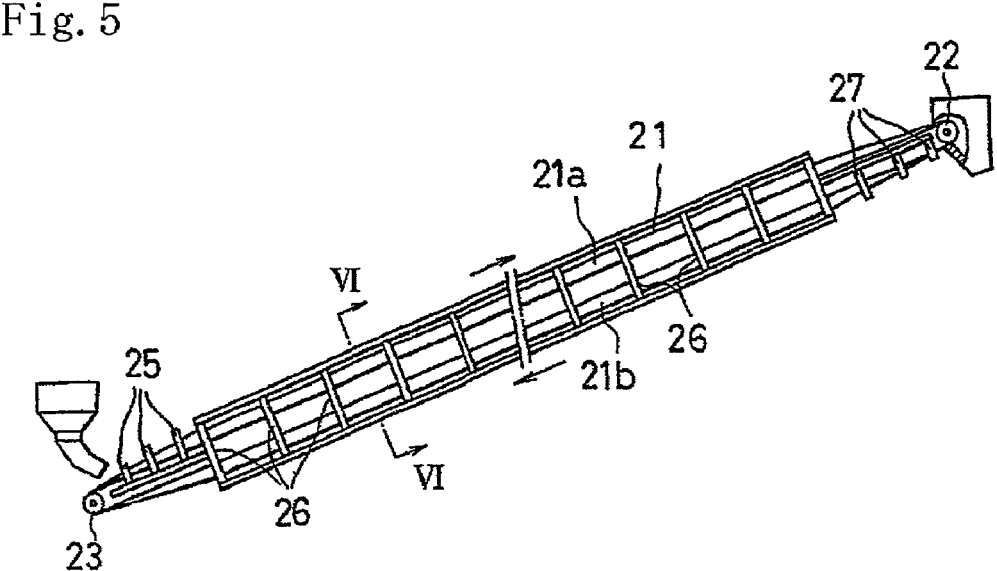
FIG. 5 is a schematic side view of a tubular conveyor belt to which the present invention applies.
Figure 6:
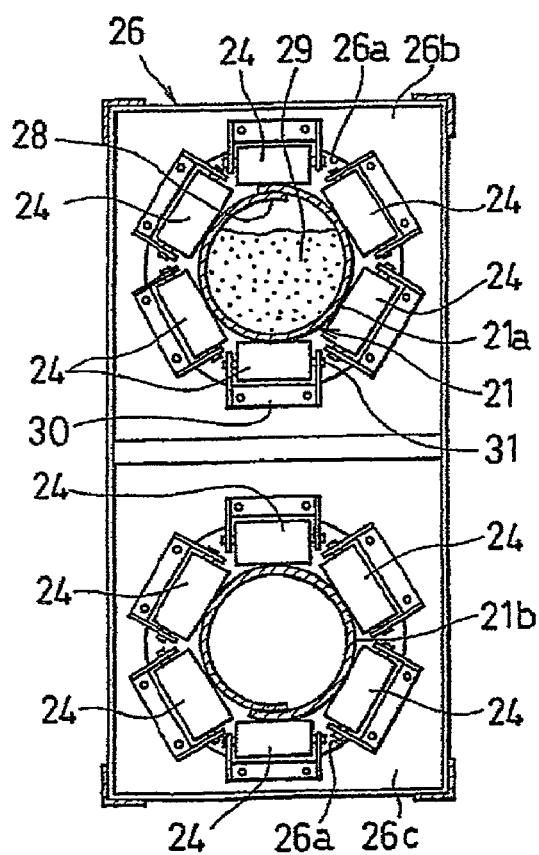
FIG. 6 is an enlarged vertical sectional view taken along the line VI-VI in FIG. 5.

The present invention may apply not only to a flat conveyor belt in FIG. 1, but also to a tubular conveyor belt in FIGS. 5 and 6.

In the tubular conveyor belt, an endless conveyor belt 21 is wound around a front end pulley 22 and a rear end pulley 23. Between the front end pulley 22 and the rear end pulley 23, the conveyor belt 21 is rolled up into a tube with an overlapped portion 28 by passing though a number of guide frames 25,26,27 in which a plurality of guide rollers 24 is arranged like a circle or a trough. Materials are enclosed in the conveyor belt 21 and conveyed with the closed overlapped portion 28.

In FIG. 6, the intermediate guide frame 26 comprises an upper chamber 26*b* and a lower chamber 26*c* each having an opening 26*a* in the middle through which the conveyor belt 21 goes. The plurality of guide rollers 24 is arranged around the opening 26*a* in each of the chambers 26*b*,26*c*.

A going belt 21*a* of the conveyor belt 21 passes through the opening 26*a* in the upper chamber 26*b*, and a returning belt 21*b* passes through the opening 26*a* in the lower chamber 26*c*, so that the belts 21*a*,21*b* are kept like a tube.

In the guide roller 24 of the tubular conveyor belt, there is provided a shaft 31 for rotatively mounting the guide roller 24 to a bracket 31 in the guide frame 26. A detector (not shown) similar to the sensor 7 in the first embodiment may be provided as well as those in the first embodiment.

What is claimed is:

1. A device for monitoring a conveyor belt, the device comprising:
   the conveyor belt having an object to be detected;
   a shaft having a flat surface facing the conveyor belt, a cavity at an axial end of the shaft and a through hole through a circumference of the shaft;
   a guide roller rotatively supported around the shaft via a bearing to form a space within the guide roller;
   a sensor on the flat surface of the shaft to face the conveyor belt to detect variation of the object of the conveyor belt; and
   a cable from the sensor to pass through the through hole and the cavity, the cable being pulled out of the axial end of the shaft.

2. The device of claim 1 wherein a plurality of shafts and a plurality of guide rollers are provided, the sensor being provided on at least one of the plurality of shafts.

3. The device of claim 1 wherein a plurality of shafts and a plurality of guide rollers are provided along width of the conveyor belt, the sensor being provided on the shaft in the space of the guide roller.

4. The device of claim 1 wherein the guide roller always contacts the conveyor belt.

5. The device of claim 1 wherein the object of the conveyor belt comprises a magnet, while the sensor comprises a magnetic sensor detecting magnetic strength from the object.

6. A device for monitoring a conveyor belt, the device comprising:
   the conveyor belt having an object to be detected;
   a shaft having a flat surface facing the conveyor belt,
   a guide roller rotatively supported around the shaft via a bearing to form a space within the guide roller;
   a sensor on the flat surface of the shaft to face the conveyor belt to detect variation of the object of the conveyor belt;
   a closure horizontally engaging with the shaft at an end and having a noncircular cross section; and
   a bracket in which the closure fits in a noncircular axial hole of the bracket to allow the sensor on the shaft to always face a surface of the conveyor belt on which materials are not conveyed.

* * * * *